US011046199B2

(12) United States Patent
Maeda

(10) Patent No.: US 11,046,199 B2
(45) Date of Patent: Jun. 29, 2021

(54) ELECTRIC VEHICLE

(71) Applicant: TOYOTA JIDOSHA KABUSHIKI KAISHA, Toyota (JP)

(72) Inventor: Hideki Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 16/568,402

(22) Filed: Sep. 12, 2019

(65) Prior Publication Data

US 2020/0139833 A1 May 7, 2020

(30) Foreign Application Priority Data

Nov. 6, 2018 (JP) .............................. JP2018-208842

(51) Int. Cl.
| | |
|---|---|
| *B60L 53/22* | (2019.01) |
| *H02M 3/158* | (2006.01) |
| *H02M 1/08* | (2006.01) |
| *B60K 1/04* | (2019.01) |
| *H02P 27/08* | (2006.01) |

(52) U.S. Cl.
CPC ................ *B60L 53/22* (2019.02); *B60K 1/04* (2013.01); *H02M 1/08* (2013.01); *H02M 3/158* (2013.01); *H02P 27/08* (2013.01); *B60L 2210/10* (2013.01)

(58) Field of Classification Search
CPC ....... B60L 53/22; B60L 2210/10; B60K 1/04; H02M 1/08; H02M 3/158; H02P 27/08
See application file for complete search history.

(56) References Cited

U.S. PATENT DOCUMENTS

| | | | |
|---|---|---|---|
| 8,963,478 B2* | 2/2015 | Becerra .................... | H02H 7/09 318/762 |
| 2015/0349671 A1* | 12/2015 | Kuhla ...................... | H02P 1/023 318/400.26 |
| 2017/0267102 A1 | 9/2017 | Hori et al. | |

FOREIGN PATENT DOCUMENTS

| | | |
|---|---|---|
| JP | 2006-158025 A | 6/2006 |
| JP | 2017-165377 A | 9/2017 |

* cited by examiner

*Primary Examiner* — Zoheb S Imtiaz
(74) *Attorney, Agent, or Firm* — Oliff PLC

(57) ABSTRACT

An electric vehicle includes a main battery, a power converter, a relay, and a controller. The power converter is a device that converts power of the main battery to drive electric power for a motor. The power converter includes a voltage sensor that measures an input voltage. The relay is connected between the main battery and the power converter. The controller stores an output value of the voltage sensor as an offset value at time after a vehicle main switch is turned on and before the relay is closed. The controller controls the power converter based on a value acquired by subtracting the offset value from the output value of the voltage sensor after the relay is closed. The controller opens the relay when a value acquired by subtracting the offset value from the travel-time output value exceeds a first voltage threshold.

2 Claims, 4 Drawing Sheets

ELECTRIC VEHICLE

INCORPORATION BY REFERENCE

The disclosure of Japanese Patent Application No. 2018-208842 filed on Nov. 6, 2018 including the specification, drawings and abstract is incorporated herein by reference in its entirety.

BACKGROUND

1. Technical Field

A technique disclosed in the present specification relates to an electric vehicle.

2. Description of Related Art

An electric vehicle includes a power converter that converts output power of a DC power supply to drive electric power for a travel motor. Such an electric vehicle (a hybrid vehicle) is disclosed in Japanese Patent Application Publication No. 2017-165377 (JP 2017-165377 A). The "electric vehicles" in the present specification include: a hybrid vehicle that includes both of a motor and an engine; and a vehicle that includes a fuel cell as a DC power supply.

The electric vehicle disclosed in JP 2017-165377 A includes a relay between the power converter and the DC power supply. When a main switch of the vehicle is turned on, a controller in the electric vehicle closes the relay. When the main switch is turned off, the controller opens the relay. A voltage sensor is provided at an input end of the power converter. The controller uses the voltage sensor to monitor a voltage of the DC power supply. When the voltage of the DC power supply exceeds a voltage threshold, in order to protect the DC power supply against an overvoltage state, the controller opens the relay to disconnect the DC power supply from the power converter. As the voltage threshold, a lower value than an upper limit voltage, which is the actual maximum value of the DC power supply, is set. That is, in order to allow an error of the voltage sensor, the voltage threshold has a safety margin.

A technique disclosed in the present specification relates to the error of the voltage sensor. As a technique of correcting the error of the voltage sensor, a technique disclosed in JP 2006-158025 A has been known. In the technique disclosed in JP 2006-158025 A, a correction value is calculated from a difference between two voltage sensors, and the power converter is controlled using a value that is acquired by adding a correction value to an output value of one of the voltage sensors.

SUMMARY

There is a case where the output value of the voltage sensor includes an offset value. The offset value of the voltage sensor in the present specification refers to the output value of the voltage sensor at the time when the voltage is not actually applied. In the case where there is a significant variation in the offset values of the voltage sensors in many production vehicles, the safety margin described above has to be increased, and the voltage threshold (the voltage used to determine the overvoltage of the DC power supply) has to be lowered for safety. As a result, there is an increased possibility that the relay is opened even when the DC power supply is normal. As a technique disclosed in the present specification, a technique of using a DC power supply as effective as possible while protecting the DC power supply against an overvoltage is provided.

An electric vehicle disclosed in the present specification includes a DC power supply, a power converter, a relay, and a controller. The power converter is a device that converts power of the DC power supply to drive electric power for a travel motor. The power converter includes a voltage sensor that measures an input voltage (that is, a voltage of the DC power supply). The relay connected between the DC power supply and the power converter. The controller controls the power converter and the relay. The controller stores an output value (an initial output value) of the voltage sensor as an offset value at time after a vehicle main switch is turned on and before the relay is closed. The controller controls the power converter on the basis of a value acquired by subtracting the offset value from the output value (a travel-time output value) of the voltage sensor after the relay is closed. The controller opens the relay in the case where a value acquired by subtracting the offset value from the travel-time output value exceeds a first voltage threshold.

When the relay is closed, the DC power supply is connected to the voltage sensor, and thus the offset value cannot be measured anymore. During travel, the relay remains closed. Thus, the offset value cannot be measured. In the electric vehicle disclosed in the present specification, after the vehicle main switch is turned on, the output value (the initial output value) of the voltage sensor is acquired and stored as the offset value in a short time period before the relay is closed. In the technique disclosed in the present specification, the offset value of the voltage sensor can be acquired in a slight opportunity in which the voltage sensor is disconnected from the DC power supply and the controller is operated.

After the relay is closed, the power converter is controlled on the basis of the value acquired by subtracting the offset value from the travel-time output value. Since the accurate offset value can be acquired, a safety margin, which is included in the first voltage threshold, can be set small. As a result, the DC power supply can efficiently be used.

In the case where the DC power supply is a battery, a mechanism of charging the battery using regenerative power (power generated by the motor) is incorporated in the electric vehicle. In such a case, the power converter includes a bidirectional voltage converter and an inverter. The bidirectional voltage converter includes a motor-side positive electrode end, a battery-side positive electrode end, a common negative electrode line, two switching elements, two freewheeling diodes, and a reactor. The motor-side positive electrode end is connected to the motor via the inverter. The battery-side positive electrode end is connected to the battery via the relay. The two switching elements are connected in series between the motor-side positive electrode end and the common negative electrode line. Each of the freewheeling diodes is connected anti-parallel to corresponding one of the switching elements. The reactor is connected between the battery-side positive electrode end and an intermediate point of series connection between the two switching elements. The switching element near the motor-side positive electrode end is involved in voltage lowering operation, and the switching element near the common negative electrode line is involved in voltage boosting operation. For convenience of the description, the former will be referred to as an upper switching element, and the latter will be referred to as a lower switching element. The freewheeling diode, which is connected anti-parallel to the upper switching element, allows a current from the battery-side positive electrode end to the motor-side positive electrode end but does not allow the current from the motor-side positive electrode end to the battery-side positive electrode end.

In the case where the electric vehicle includes the bidirectional voltage converter described above, and in the case where the value acquired by subtracting the offset value from the travel-time output value is higher than a second voltage threshold, which is lower than the first voltage threshold, and is equal to or lower than the first voltage threshold, the controller holds the upper switching element to be off. As a result, the regenerative power is not supplied to the DC power supply. Thus, boosting of the voltage of the battery can be suppressed. Meanwhile, power supply from the battery to the motor continues. Thus, the motor can be driven continuously using the battery while the boosting of the voltage of the battery is suppressed.

Details of the technique disclosed in the present specification and further improvement therein will be described in "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
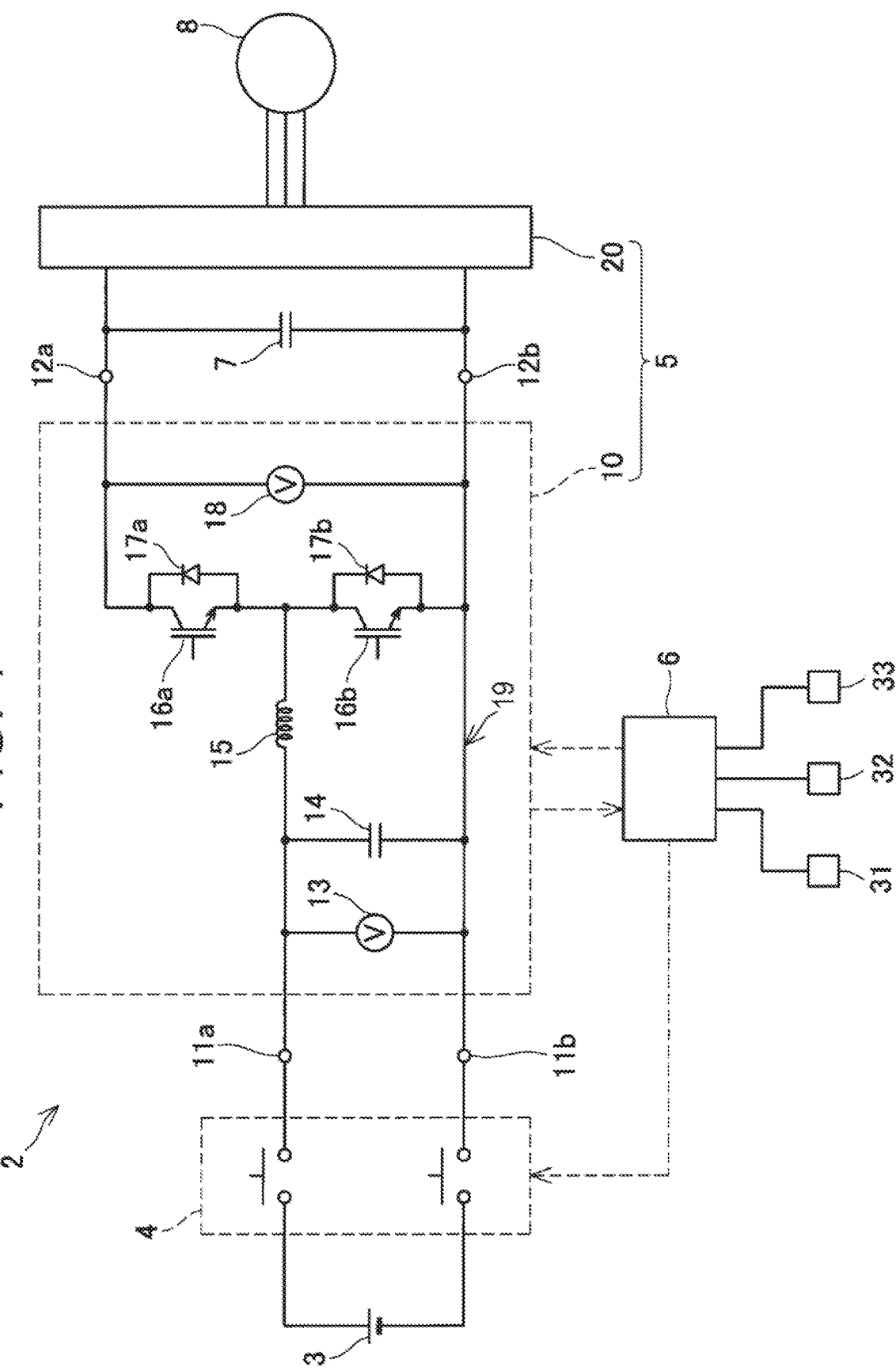
FIG. 1 is a block diagram of an electric vehicle according to an embodiment.

A description will be made on an electric vehicle 2 according to an embodiment with reference to the drawings. FIG. 1 is a block diagram of a power system in the electric vehicle 2. The electric vehicle 2 according to the embodiment includes a main battery 3, a system main relay 4, a power converter 5, a controller 6, and a travel motor 8.

The main battery 3 is a power supply for driving the motor 8, and an output voltage of the main battery 3 exceeds 100 volts. The main battery 3 is a lithium-ion battery, for example. The motor 8 is a three-phase AC motor. The power converter 5 is connected to the main battery 3 via the system main relay 4, and is also connected to the motor 8. The power converter 5 converts DC power output from the main battery 3 to drive electric power (AC power) for the motor 8.

The system main relay 4 is controlled by the controller 6. The system main relay 4 is of a normally-open type, and is held in an open state while the power is not supplied thereto. When a vehicle main switch 31 is switched from OFF to ON, the controller 6 closes the system main relay 4 and connects the main battery 3 to the power converter 5. When the vehicle main switch 31 is switched from ON to OFF, the controller 6 opens the system main relay 4 and disconnects the main battery 3 from the power converter 5. Although not shown, the electric vehicle 2 includes a sub-battery. The sub-battery supplies power to low-power equipment such as the controller 6 and the system main relay 4.

Broken arrows in the drawing represent flows of a signal. As described above, the controller 6 controls the system main relay 4. In addition, the controller 6 calculates a target output value of the motor 8 on the basis of sensor data of a vehicle speed sensor 32 and an accelerator operation amount sensor 33. The controller 6 controls the power converter 5 to achieve the target output value. As will be described below, the power converter 5 includes several switching elements, and the controller 6 controls the switching elements of the power converter 5 such that output of the power converter 5 matches the target output value.

The power converter 5 includes a bidirectional voltage converter 10, an inverter 20, and a smoothing capacitor 7. Low-voltage ends 11 (a low-voltage positive electrode end 11a, a low-voltage negative electrode end 11b) of the bidirectional voltage converter 10 are connected to the main battery 3 via the system main relay 4. High-voltage ends 12 (a high-voltage positive electrode end 12a, a high-voltage negative electrode end 12b) are connected to the inverter 20. In other words, the high-voltage ends 12 are connected to the motor 8 via the inverter 20. The low-voltage negative electrode end 11b and the high-voltage negative electrode end 12b are mutually connected by a common negative electrode line 19.

The smoothing capacitor 7 is connected in parallel between the high-voltage positive electrode end 12a and the high-voltage negative electrode end 12b of the bidirectional voltage converter 10. The smoothing capacitor 7 is provided to suppress pulsations of a current flowing between the bidirectional voltage converter 10 and the inverter 20.

The inverter 20 converts the DC power output from the bidirectional voltage converter 10 to the AC power and supplies the AC power to the motor 8. There is a case where the motor 8 uses inertial energy of the vehicle to generate the power. The power generated by the motor 8 is also referred to as regenerative power. The inverter 20 can also convert the regenerative power (the AC power) of the motor 8 to the DC power and supply the DC power to the bidirectional voltage converter 10. Because a circuit configuration of the inverter 20 is well known, the circuit configuration is neither illustrated nor described.

The bidirectional voltage converter 10 has: a boosting function to boost the voltage of the main battery 3 and supply the boosted voltage to the inverter 20; and a lowering function to lower a voltage of the regenerative power (the DC power) supplied from the inverter 20 and supply the lowered voltage to the main battery 3. In the following description, the bidirectional voltage converter 10 will simply be referred to as a voltage converter 10 for convenience of the description.

A description will be made on a circuit configuration of the voltage converter 10. The voltage converter 10 includes: a filter capacitor 14, a reactor 15, switching elements 16a, 16b, freewheeling diodes 17a, 17b, and voltage sensors 13, 18. The two switching elements 16a, 16b are connected in series between the high-voltage positive electrode end 12a and the high-voltage negative electrode end 12b (that is, the common negative electrode line 19). Hereinafter, the switching element 16a near the high-voltage positive electrode end 12a may be referred to as the upper switching element 16a, and the switching element 16b near the high-voltage negative electrode end 12b (the common negative electrode line 19) may be referred to as the lower switching element 16b. Each of the switching elements 16a, 16b is an n-type insulated gate bipolar transistor (IGBT) or an n-type metal oxide semiconductor field effect transistor (MOSFET). When turned on, each of the switching elements 16a, 16b allows the current from a collector (a drain) to an emitter (a source).

The freewheeling diode 17a is connected anti-parallel to the upper switching element 16a, and the freewheeling diode 17*b* is connected anti-parallel to the lower switching element 16*b*. In detail, a cathode of the freewheeling diode 17*a* is connected to the collector (the drain) of the upper switching element 16*a*, and an anode of the freewheeling diode 17*a* is connected to the emitter (source). A connection relationship between the lower switching element 16*b* and the freewheeling diode 17*b* is also the same.

The reactor 15 is connected between the low-voltage positive electrode end 11*a* and an intermediate point of the series connection between the two switching elements 16*a*, 16*b*. The filter capacitor 14 is connected between the low-voltage positive electrode end 11*a* and the low-voltage negative electrode end 11*b* (that is, the common negative electrode line 19).

The voltage sensor 13 measures the voltage between the low-voltage positive electrode end 11*a* and the low-voltage negative electrode end 11*b*. In other words, the voltage sensor 13 measures the voltage of the main battery 3. The voltage sensor 18 measures the voltage between the high-voltage positive electrode end 12*a* and the high-voltage negative electrode end 12*b* (that is, the common negative electrode line 19). In other words, the voltage sensor 18 measures the voltage of the voltage converter 10 on the inverter side.

The switching element 16*a*, 16*b* are controlled by the controller 6. The controller 6 determines a target voltage ratio between the voltage of the voltage converter 10 on the battery side and the voltage of the voltage converter 10 on the inverter side on the basis of the sensor data of the vehicle speed sensor 32 and the accelerator operation amount sensor 33. The controller 6 controls the switching element 16*a*, 16*b* such that an actual voltage ratio matches the target voltage ratio on the basis of sensor data of the voltage sensors 13, 18.

The lower switching element 16*b* and the freewheeling diode 17*a* are mainly involved in the boosting function, and the upper switching element 16*a* and the freewheeling diode 17*b* are mainly involved in the voltage lowering function. In order to achieve the target voltage ratio, the controller 6 generates a drive signal (a PWM signal) of each of the switching elements 16*a*, 16*b* and supplies the drive signal to each of the switching elements 16*a*, 16*b*.

The drive signal will be described. A duty ratio of each of the switching elements 16*a*, 16*b* is determined according to the target voltage ratio. The duty ratio of the upper switching element 16*a* and the duty ratio of the lower switching element 16*b* have a relationship of becoming 100% when being added. The controller 6 generates such drive signals that the lower switching element 16*b* is turned off when the upper switching element 16*a* is on and that the lower switching element 16*b* is turned on when the upper switching element 16*a* is off. In other words, the PWM signal (the drive signal) for the upper switching element 16*a* and the PWM signal (the drive signal) for the lower switching element 16*b* have a complementary relationship. When such a drive signal is supplied to each of the switching elements 16*a*, 16*b*, the boosting and the lowering of the voltage is passively switched according to balance between the voltage of the low-voltage ends 11 and the voltage of the high-voltage ends 12. More specifically, the boosting and the lowering of the voltage is passively switched in response to a driver's acceleration operation.

As described above, the controller 6 controls the power converter 5 on the basis of output values of the voltage sensors 13, 18. The output value of the voltage sensor 13 includes an offset value. The offset value is a value that is output from the voltage sensor 13 despite a fact that the voltage is not actually applied to both ends of the voltage sensor 13. The output value of the voltage sensor 18 also includes a similar offset value. Before the controller 6 closes the system main relay 4, that is, when the voltage is not applied to both ends of each of the voltage sensors 13, 18, the controller 6 stores the output value of each of the voltage sensors 13, 18 as the offset value. During travel, the controller 6 controls the power converter 5 (the switching element 16*a*, 16*b*, and the like) on the basis of a value acquired by subtracting the offset value from the output value of each of the voltage sensors 13, 18. The controller 6 also controls the inverter 20 on the basis of the sensor data of the vehicle speed sensor 32 and the accelerator operation amount sensor 33. Hereinafter, for convenience of the description, the output value of each of the voltage sensors 13, 18 before closing the system main relay 4 will be referred to as an initial output value, and the output value of each of the voltage sensors 13, 18 after closing the system main relay 4 will be referred to as a travel-time output value. The travel-time output value also includes the output value at the time when the vehicle stops for a traffic light, for example.

Figure 2:
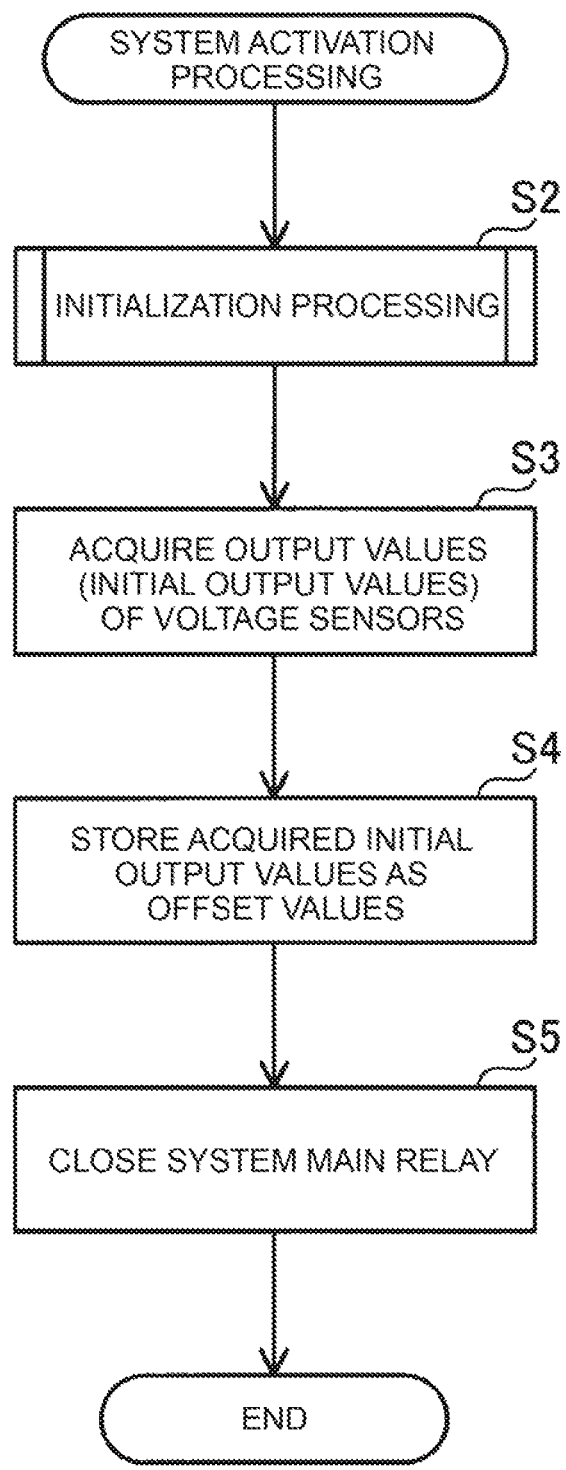
FIG. 2 is a flowchart of system activation processing.

FIG. 2 shows a flowchart of processing (system activation processing) by the controller 6 after the vehicle main switch 31 is turned on. The processing shown in FIG. 2 is activated when the main switch 31 is turned on. As described above, while the main switch 31 is off, the system main relay 4 is held off (in the open state).

When the main switch 31 is switched from off to on, the controller 6 first executes initialization processing (step S2). The initialization processing is processing to activate various devices required for the travel. The controller 6 and each of the devices activated in the initialization processing are operated using the sub-battery. Accordingly, even when the system main relay 4 is held off, the controller 6 and the other devices can be operated by the supply of the power from the sub-battery. A detailed description on the initialization processing will not be made.

Next, the controller 6 acquires the output values (the initial output values) of the voltage sensors 13, 18 (step S3). Then, the controller 6 stores the acquired initial output values as the offset values (step S4). The controller 6 stores the initial output value acquired from the voltage sensor 13 as the offset value of the voltage sensor 13, and stores the initial output value acquired from the voltage sensor 18 as the offset value of the voltage sensor 18. Lastly, the controller 6 closes the system main relay 4 (step S5). By closing the system main relay 4, the main battery 3 is connected to the power converter 5, and the vehicle becomes ready for the travel. The processing in step S3 to S5 will be described below in a different way. At the time after the vehicle main switch 31 is turned on and before the system main relay 4 is closed, the controller 6 stores the output values (the initial output values) of the voltage sensors 13, 18 as the offset values.

Figure 3:
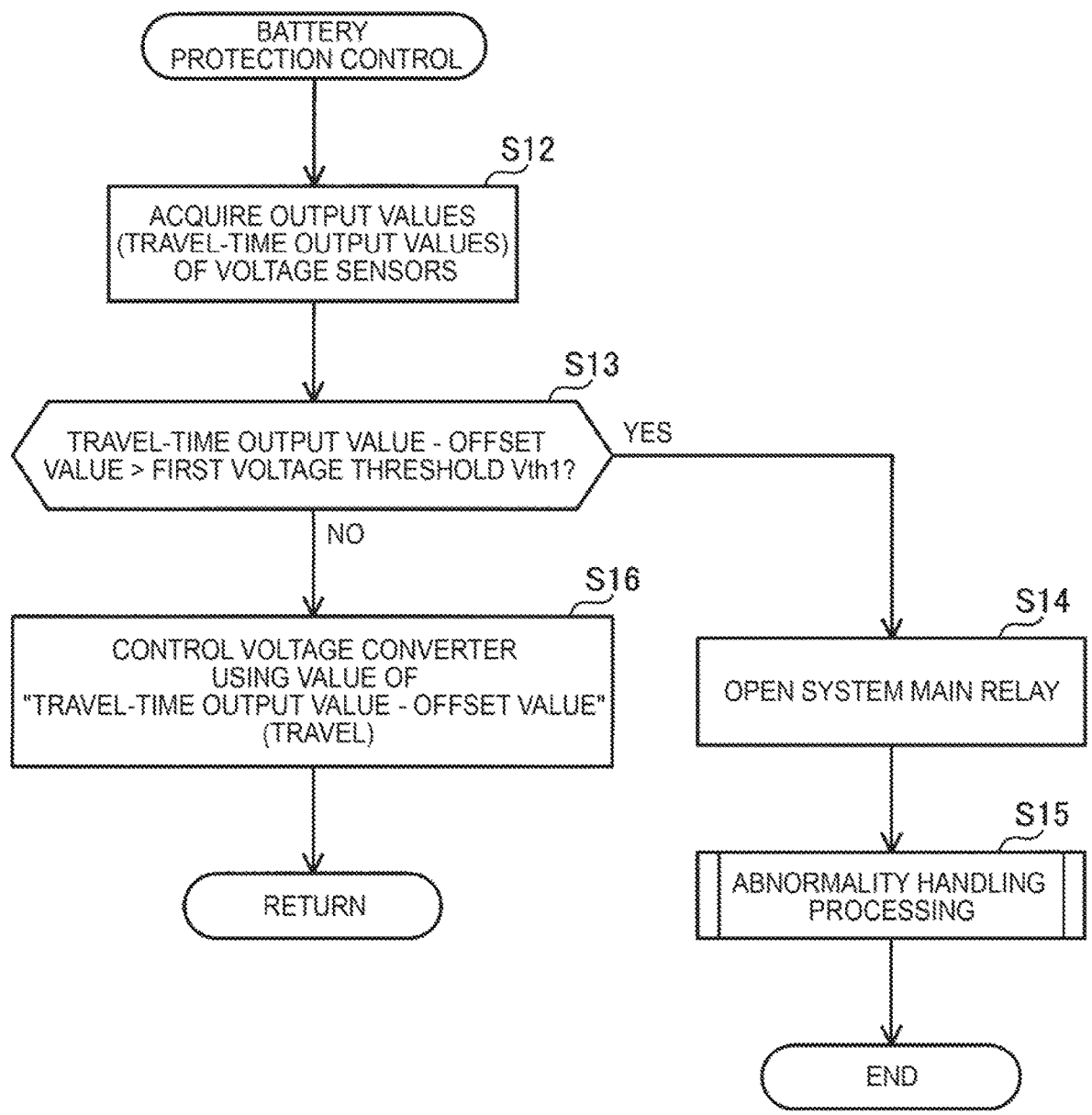
FIG. 3 is a flowchart of battery protection control.

The stored offset values are used during the travel. During the travel, while controlling the power converter 5 according to the driver's acceleration operation, the controller 6 opens the system main relay 4 to protect the main battery at the time when the voltage of the main battery becomes excessively high. FIG. 3 shows a flowchart of battery protection control. During the travel, the controller 6 executes processing in FIG. 3 in specified cycles.

The controller 6 acquires the output values (the travel-time output values) of the voltage sensors 13, 18 (step S12). If a value acquired by subtracting the offset value from the travel-time output value exceeds a first voltage threshold Vth1 (step S13: YES), the controller 6 opens the system main relay 4 (step S14) and lastly executes abnormality handling processing (step S15). Since the controller 6 opens the system main relay 4, the vehicle cannot travel anymore. For example, the abnormality handling processing is processing to light a warning lamp indicating that the vehicle cannot travel anymore or to communicate with an external service center by wireless communication. Note that, in the case where the electric vehicle 2 is the hybrid vehicle including the engine, in step S15, the electric vehicle 2 is shifted into an emergency travel mode in which the electric vehicle 2 travels only by the engine.

A purpose of providing step S13 is to detect abnormality of the voltage of the main battery 3. Thus, in step S13, only the value acquired by subtracting the offset value from the output value (the travel-time output value) of the voltage sensor 13 and the first voltage threshold Vth1 is compared.

If the value acquired by subtracting the offset value from the travel-time output value of the voltage sensor 13 is equal to or lower than the first voltage threshold Vth1 (step S13: NO), the controller 6 controls the voltage converter 10 using the value acquired by subtracting the offset value from the travel-time output value (step S16). In step S16, the offset value is subtracted from corresponding one of the travel-time output values of the voltage sensors 13, 18. The controller 6 determines the duty ratio of each of the switching elements 16a, 16b such that a ratio between the value acquired by subtracting the corresponding offset value from the travel-time output value of the voltage sensor 13 and the value acquired by subtracting the corresponding offset value from the travel-time output value of the voltage sensor 18 matches the target voltage ratio. The PWM signal at the determined duty ratio is supplied to each of the switching elements 16a, 16b. Due to the processing in step S16, the electric vehicle 2 travels.

A description will be made on advantages of the electric vehicle 2 according to the embodiment. At the time after the vehicle main switch 31 is switched from off to on and before the system main relay 4 is closed, the electric vehicle 2 acquires the output values (the initial output values) of the voltage sensors 13, 18 and stores the acquired output values as the offset values. In other words, the controller 6 stores the output values (the initial output values) of the voltage sensors 13, 18 at the time when the main battery 3 is disconnected from the voltage sensors 13, 18 as the offset values. During the travel, the voltage converter 10 is controlled using the value acquired by subtracting the corresponding offset value from the output value (the travel-time output value) of each of the voltage sensors 13, 18.

The first voltage threshold Vth1 is set to a value with which it is possible to determine that the main battery 3 is in an overvoltage state when the output voltage of the main battery 3 exceeds such a value. However, in order to allow an error of the voltage sensor 13, the first voltage threshold Vth1 is set to a value acquired by subtracting a specified safety margin from the voltage used to determine the overvoltage state.

During the travel, in the case where the value acquired by subtracting the offset value from the travel-time output value of the voltage sensor 13 exceeds the first voltage threshold Vth1, the controller 6 opens the system main relay 4 and disconnects the main battery 3 from the power converter 5. The controller 6 executes the battery protection control on the basis of the value acquired by subtracting the offset value from the travel-time output value of the voltage sensor 13. Since the offset value is accurate, the safety margin, which is included in the first voltage threshold Vth1 used in the main battery protection control, can be set small. Thus, the electric vehicle 2 can effectively use the main battery 3.

Figure 4:
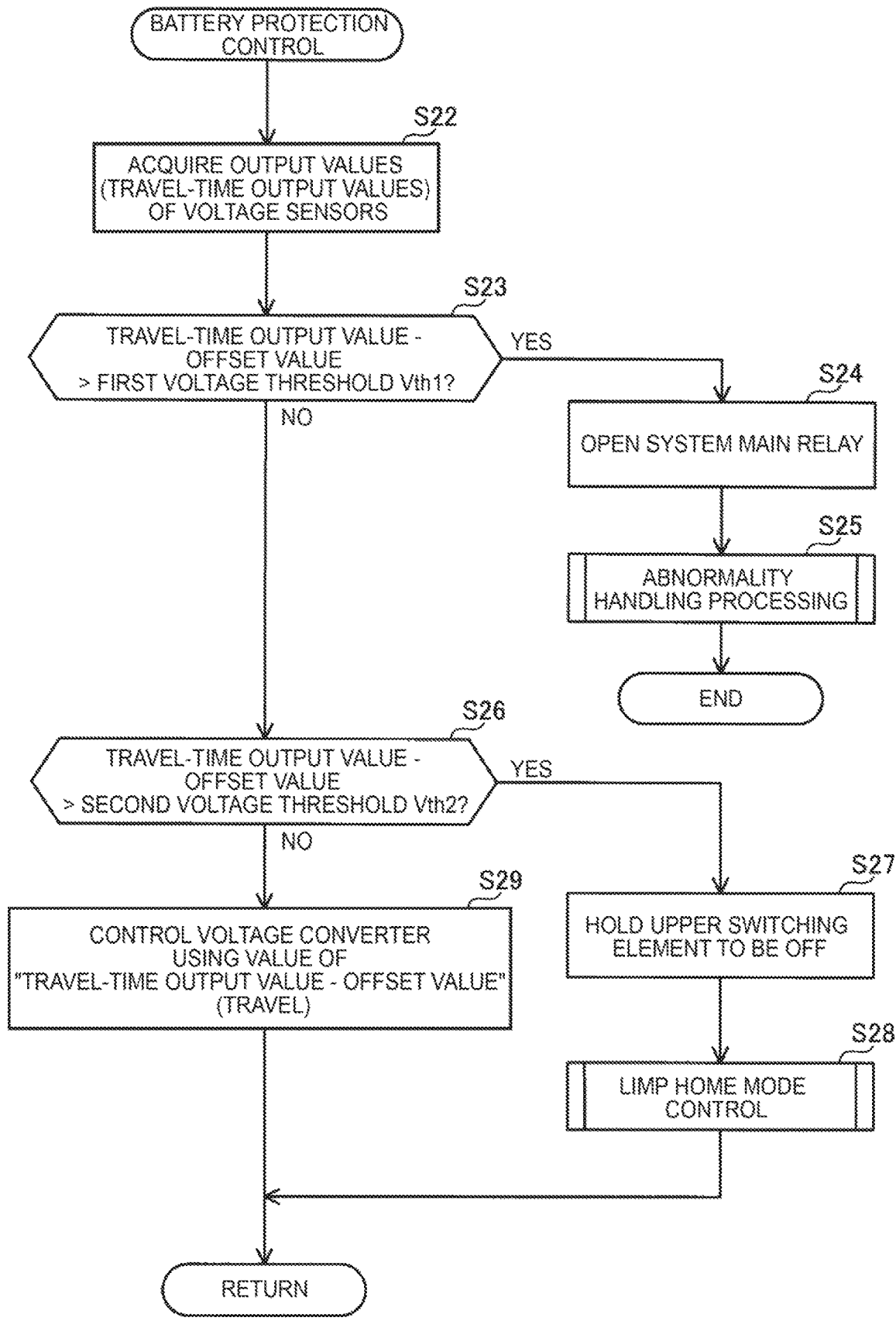
FIG. 4 is a flowchart of battery protection control in a modified embodiment.

Next, a description will be made on battery protection control in a modified embodiment. FIG. 4 is a flowchart of the battery protection control in the modified embodiment. Processing in step S22 to step S25 shown in FIG. 4 is the same as the processing in step S12 to step S15 shown in FIG. 2. Thus, a description thereon will not be made.

If the value acquired by subtracting the offset value from the travel-time output value of the voltage sensor 13 is equal to or lower than the first voltage threshold Vth1 (step S23: NO), the controller 6 checks whether the value acquired by subtracting the offset value from the travel-time output value of the voltage sensor 13 exceeds a second voltage threshold Vth2 (step S26). Here, the second voltage threshold Vth2 is set as a lower value than the first voltage threshold Vth1. The first voltage threshold Vth1 is set as a value acquired by subtracting the specified safety margin from the voltage, which indicates the overvoltage state, and at which the output of the main battery 3 has to be stopped immediately. The second voltage threshold Vth2 is set as the voltage meaning that the output of the main battery 3 does not have to be stopped immediately but the boosting of the voltage of the main battery 3 has to be stopped.

If the value acquired by subtracting the offset value from the travel-time output value of the voltage sensor 13 exceeds the second voltage threshold Vth2 (step S26: YES), the controller 6 holds the upper switching element 16a in the voltage converter 10 to be off (step S27). As described above, the upper switching element 16a is involved in the voltage lowering operation. When the upper switching element 16a is held off, the voltage lowering operation is not performed, and the regenerative power of the motor 8 is no longer supplied to the main battery 3. Thus, the boosting of the voltage of the main battery 3 is suppressed.

After executing step S27, the controller 6 executes limp home mode control (step S28). The limp home mode control is control in which the electric vehicle 2 continues traveling under a restriction so as to reduce a load on the main battery 3. In the limp home mode control, the controller 6 controls a rotational speed of the motor 8 according to a vehicle speed such that the motor 8 does not generate the regenerative power during deceleration. During the limp home mode control, a mechanical brake is controlled according to a depression amount of a brake pedal so that a target braking force can be generated only by the mechanical brake.

In the limp home mode control, the main battery 3 is not charged by the regenerative power. Accordingly, the controller 6 sets an upper limit value of the output of the main battery 3 to a lower value than the upper limit value in a normal time. By reducing the upper limit value of the output of the main battery 3, a power consumed amount by the main battery 3 is suppressed, so as to allow the electric vehicle 2 to travel for as a long distance as possible. In addition, in the limp home mode control, a warning lamp indicating that the main battery 3 is abnormal is lit.

If the value acquired by subtracting the offset value from the travel-time output value of the voltage sensor 13 is equal to or lower than the second voltage threshold Vth2 (step S26: NO), the controller 6 executes processing in step S29. The processing in step S29 is the same as the processing in step S16 shown in FIG. 3. The controller 6 controls the voltage converter 10 on the basis of the value acquired by subtracting the corresponding offset value from the travel-time output value of each of the voltage sensors 13, 18. In other words, in step S29, the normal travel control is executed.

In the battery protection control according to the modified embodiment, in the case where the value acquired by subtracting the offset value from the travel-time output value of the voltage sensor 13 is equal to or lower than the first voltage threshold Vth1 and exceeds the second voltage threshold Vth2, the electric vehicle 2 continues traveling while the further boosting of the voltage of the main battery 3 is suppressed. In the battery protection control according to the modified embodiment, under a situation that is not serious enough to immediately disconnect the main battery 3 but where the boosting of the voltage of the main battery 3 is desirably suppressed, the electric vehicle 2 can continue traveling while the boosting of the voltage of the main battery 3 is suppressed. That is, the main battery 3 can effectively be used.

The controller 6 repeatedly executes the processing in FIG. 4 in specified cycles. In the case where the determination in step S26 becomes NO after the determination in step S26 is YES, the normal travel control (step S29) is executed.

Points to note that relate to the technique described in the embodiment will be described. Every time the vehicle main switch 31 is turned on from off, the controller 6 stores the output values (the initial output values) of the voltage sensors 13, 18 as the offset values. Because the offset values are updated every time the main switch 31 is turned on, the controller 6 can always determine whether the main battery 3 is in the overvoltage state on the basis of the latest offset values.

The protection control shown in FIG. 3 is preferably applied to the electric vehicle on which a fuel cell is mounted as the DC power supply instead of the main battery 3.

The abnormality handling processing shown in FIG. 3 and FIG. 4 is not limited to the processing described above. The limp home mode control shown in FIG. 4 is not limited to the processing described above. The limp home mode control only has to be a travel mode in which a certain type of the restriction is added to the normal travel.

The main battery 3 in the embodiment is an example of the DC power supply. The low-voltage positive electrode end 11*a* of the voltage converter 10 is an example of the battery-side positive electrode end. The high-voltage positive electrode end 12*a* is an example of the motor-side positive electrode end. The upper switching element 16*a* is an example of the switching element near the motor-side positive electrode end.

The specific examples of the disclosure have been described so far in detail. However, these specific examples are merely illustrative and do not limit the claims. The technique described in the claims includes various modifications and changes that are made to the specific examples described so far. The technical elements that are described in the present specification and the drawings demonstrate technical utility when used singly or in various combinations, and thus are not limited to the combinations described in the claims in the original application. In addition, the techniques that are described in the present specification and the drawings can achieve a plurality of objects simultaneously, and the achievement of one object thereof itself has technical utility.

What is claimed is:

1. An electric vehicle comprising:
   a DC power supply;
   a power converter that converts power of the DC power supply to drive electric power for a travel motor, the power converter including a voltage sensor that measures an input voltage;
   a relay connected between the DC power supply and the power converter; and
   a controller that controls the power converter and the relay, wherein
   the controller
      stores an output value (an initial output value) of the voltage sensor as an offset value at time after a vehicle main switch is turned on and before the relay is closed,
      controls the power converter on the basis of a value acquired by subtracting the offset value from the output value (a travel-time output value) of the voltage sensor after the relay is closed, and
      opens the relay in the case where a value acquired by subtracting the offset value from the travel-time output value exceeds a first voltage threshold.

2. The electric vehicle according to claim 1, wherein
   the DC power supply is a battery,
   the power converter includes a bidirectional voltage converter and an inverter,
   the bidirectional voltage converter includes:
      a motor-side positive electrode end that is connected to the motor via the inverter;
      a battery-side positive electrode end that is connected to the battery via the relay;
      a common negative electrode line;
      two switching elements that are connected in series between the motor-side positive electrode end and the common negative electrode line;
      freewheeling diodes, each of which is connected antiparallel to corresponding one of the switching elements; and
      a reactor that is connected between the battery-side positive electrode end and an intermediate point of series connection between the two switching element, and
   the controller holds the switching element near the motor-side positive electrode end to be off in the case where the value acquired by subtracting the offset value from the travel-time output value is higher than a second voltage threshold, which is lower than the first voltage threshold, and is equal to or lower than the first voltage threshold.

* * * * *